United States Patent [19]
Kojo

[11] 4,102,080
[45] Jul. 25, 1978

[54] FLOWERPOT

[76] Inventor: Dairoku Kojo, 3-2-6-402, Chishirodai Minami, Chiba City Chiba Prefecture, Japan

[21] Appl. No.: 739,376

[22] Filed: Nov. 5, 1976

[51] Int. Cl.² .............................................. A01G 9/02
[52] U.S. Cl. .......................................................... 47/67
[58] Field of Search ...................................... 47/66-72, 47/79-81

[56] References Cited

U.S. PATENT DOCUMENTS

| 112,748 | 3/1871 | Stigale | 47/68 |
| 153,715 | 8/1874 | Landers | 47/71 |
| 470,437 | 3/1892 | McElhiney | 47/81 |
| 491,786 | 2/1893 | Schurig et al. | 47/67 |
| 1,597,380 | 8/1926 | Krgssk | 47/67 |

FOREIGN PATENT DOCUMENTS

| 542,108 | 11/1955 | Belgium | 47/66 |
| 60,951 | 5/1943 | Denmark | 47/67 |
| 1,170,322 | 3/1957 | France | 47/71 |
| 66,660 | 6/1892 | Fed. Rep. of Germany | 47/67 |

Primary Examiner—Edgar S. Burr
Assistant Examiner—James R. Feyrer
Attorney, Agent, or Firm—Frank J. Jordan

[57] ABSTRACT

A flowerpot, comprised of a body portion for receiving soil, said body portion having a top opening, a base with a flat bottom face and a means for hanging said body portion on any vertical flat surface; and a water-receiving bowl portion adapted to be detachably mounted on the base of said body portion, said base of said body portion having an aperture for communicating the interior of said body portion to said water-receiving bowl portion.

6 Claims, 5 Drawing Figures

FLOWERPOT

DETAILED DESCRIPTION

The present invention relates to an improved flowerpot.

It is an object of the present invention to provide an improved flowerpot which can not only hang itself from any vertical fixed surface, but also place itself on any horizontal fixed surface.

According to the present invention, an improved flowerpot is provided comprised of a body portion for receiving soil, said body portion having a top opening, a base with a flat bottom face and means for hanging said body portion on any vertical flat surface; and a water-receiving bowl portion adapted to be detachably mounted on the base of said body portion; said base having an aperture for comunicating the interior of said body portion to said water-receiving bowl portion.

The present invention will now be described by way of example with reference to the accompanying drawings in which.

Figure 1:
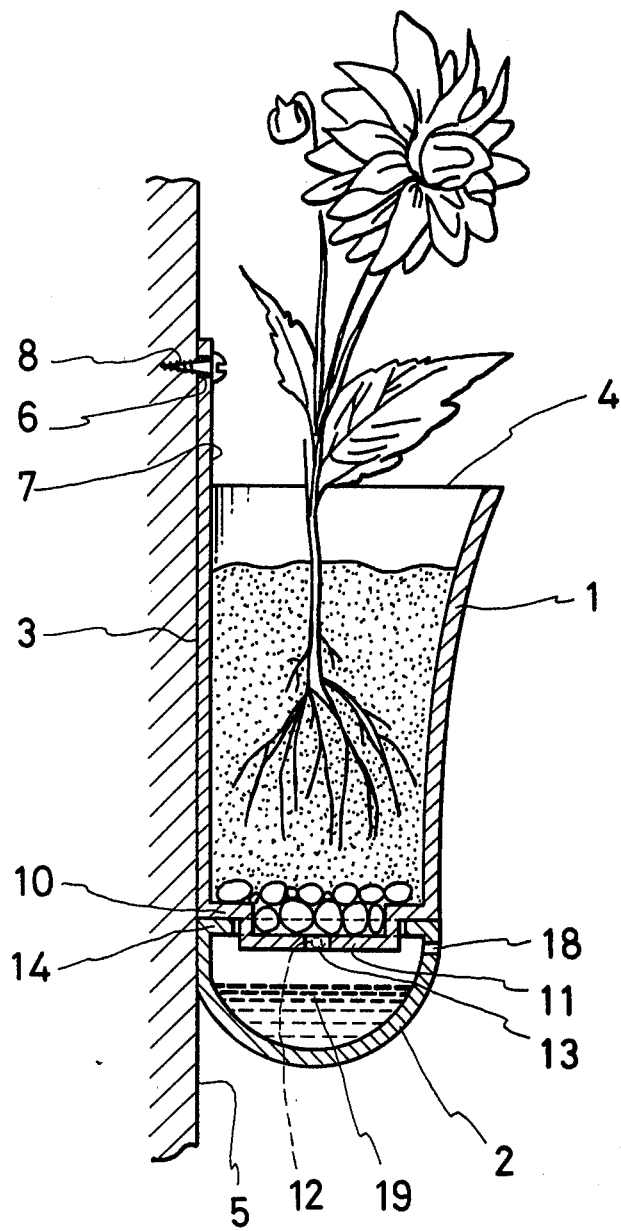
FIG. 1 is a vertical cross-sectional view showing a flowerpot assembly hung from a vertical wall.
Figure 2:
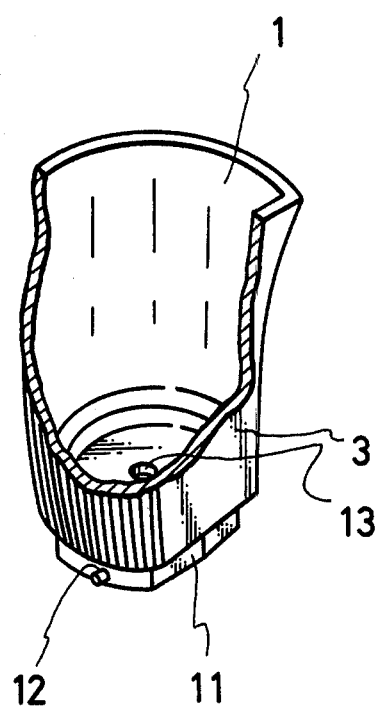
FIG. 2 is a perspective rear view showing, partially broken away, the body portion of the flowerpot shown in FIG. 1.
Figure 3:
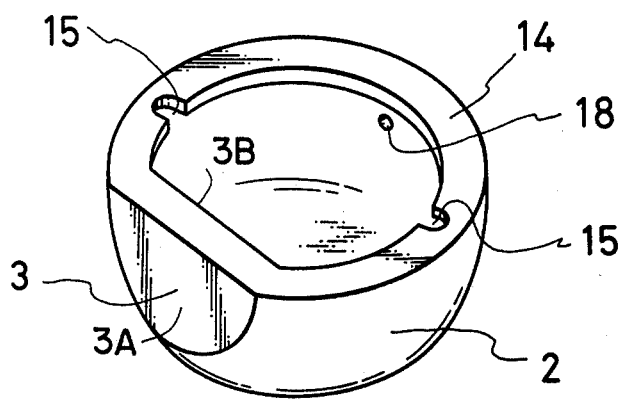
FIG. 3 is a perspective view showing the water-receiving bowl portion of the flowerpot shown in FIG. 1.

Referring to the drawings, a flowerpot according to the present invention is comprised of a body portion 1 which may be made from any material such as clay, ceramic, plastic, etc. The body portion has a flared top opening 4 and a flat rear wall 3 which may have an extension 7 extending upwardly therefrom with an aperture for hanging the body portion 1 from a vertical flat wall 5 by means of any suitable fastener such as a screw 8. The body portion contains an amount of soil for planting flowers. The body portion 1 includes also a base 11 extending downwardly from the bottom face 10 of the body portion 1. The base 11 has a substantially circular shape in cross-section and is formed with a pair of engaging pins 12 protruding diametrically from the side wall of the base 11 for a purpose described hereinafter. The side wall of the base 11 includes a first flat portion 17 disposed substantially parallel to the flat rear wall 3 of the body portion 1 and a second flat portion 16 inclined inwardly to the first flat portion 17. The purpose for providing these flat side wall portions 16 and 17 in the base 11 will be hereinafter desdribed. The base 11 includes also a flat bottom with a central aperture 13 formed therein. This flat bottom serves as support for the body portion 1 when placed upright on any horizontal flat surface.

The flowerpot assembly of the present invention is also comprised of a water-receiving bowl portion 2 which can be detachably mounted on the base 11 of the body portion. This bowl portion 2 is of a substantially semi-spherical shape, and has a flat side portion 3A corresponding to the flat rear wall 3 of the body portion 1 and a top flange 14 extending inwardly from the top edge of the bowl portion 2. The flange 14 has its inner edge defining an opening substantially corresponding to the outer periphery of the base 11. The inner edge of the flange 14 is provided with a straight edge portion 3B disposed parallel to the side portion 3A and a pair of notches 15 directed inwardly therefrom which are disposed along a diametrical line inclined to the flat side portion 3A of the bowl portion 2 by an angle. This angle is equal to an angle included between the second flat portion 16 of the base 11 and a diametrical line including the engaging pins 12. The notches 15 of the bowl portion 2 serves to mount the bowl portion on the body portion 1 by cooperating with the engaging pins 12 of the base 11, as will be hereinafter described. The bowl portion 2 is also provided with a vent 18 for communicating the interior of the bowl portion 2 with the atmosphere.

Figure 5:
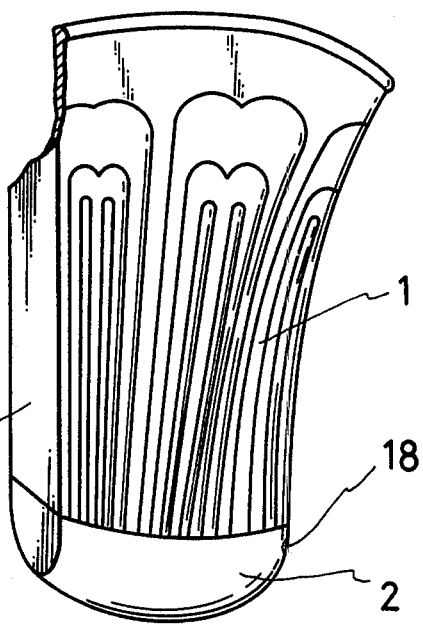
FIG. 5 is a perspective side view showing, partially broken away, the flowerpot assembly in FIG. 1.
Figure 4:
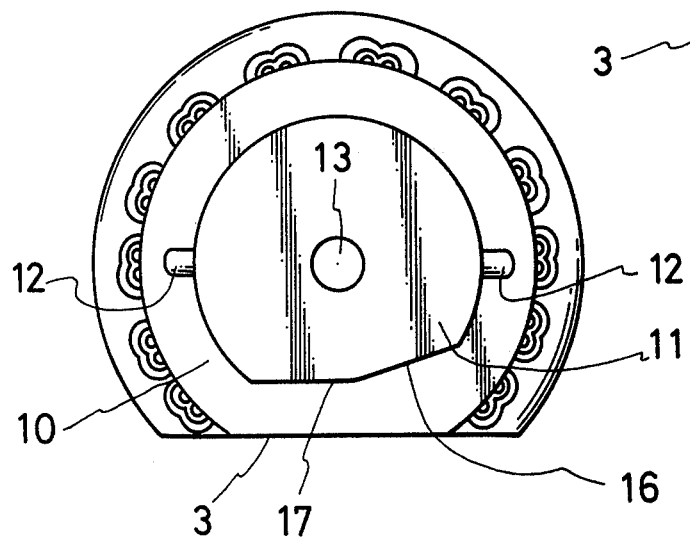
FIG. 4 is a bottom view of the body portion.

As is apparent from the foregoing, the flowerpot assembly according to the present invention provides the body portion which may be placed on any horizontal surface with the flat bottom thereof as in any conventional flowerpot. When the flowerpot of the present invention is desired to be hung on any vertical fixed surface, the bowl portion 2 is mounted on the base 11 of the body portion 1 in such a manner that the base 11 is inserted into the opening defined by the flange 14 of the bowl portion 2 after the respective alignments between the straight edge portion 3B of the bowl portion 2 and the second flat portion 16 of the base 11 and between the notches 15 of the flange 14 and the pins 12 of the base 11 are effected, and then the bowl portion 2 is rotated clockwise with respect to the body portion 1 so that the pins 12 are engaged by the lower surface of the flange 14 to firmly connect the bowl portion 2 with the body portion 1 with the rear wall 3 aligned to the side portion 3A. The upper surface of the flange 14 is close together with the flat bottom face 10 of the body portion 1 to provide a one-pieced appearance as seen best from FIG. 5. The bowl portion 2 is adapted to receive an excess of water 19 which flows into the bowl portion 2 through the aperture 13 of the base 11 from the body portion 1.

While the preferred embodiment of the present invention has been described with reference to the accompanying drawings, the present invention is not intended to be limited to such described structure, arrangement and configuration wherein many changes and modifications may be effected without departing from the scope and spirit of the invention defined by the appended claims. For example, the rear wall 3 of the body portion 1 may have its top edge terminating at the top of the body portion 1. In this case, the aperture 6 for receiving any fastening means may be provided at the top portion of the rear wall 3. Moreover, the fastening means may be in the form of a hook-like member adapted to be hooked on any suitable means such as a nail or screw.

I claim:

1. A flowerpot comprising a body having a top opening for receiving soil, said body having a side wall comprised of a first portion of a generally arcuate configuration and a second portion which is generally flat, said body having a bottom wall comprised of a first peripheral portion extending inwardly from said side wall of said body and a second cup-shaped portion depending downwardly from said peripheral portion, said cup-shaped portion having a flat bottom section and an upright section joined to said peripheral portion, a water-receiving bowl comprising a first portion of a generally arcuate configuration and a second portion which is generally flat, said bowl having a peripheral flange section defining a bowl opening, said bowl being detachably mounted on said body such that said cup-shaped portion of said body bottom wall is received in said bowl opening with said peripheral flange section of said bowl abutting said first peripheral portion of said body, said upright section of said cup-shaped portion having lateral projections which underlie said peripheral flange section of said bowl to thereby securely support said bowl on said body, said bowl upon being mounted on said body being rotatable to a selective position so that said flat portions of said body and bowl and said arcuate portions of said body and bowl are respectively aligned with each other, said flowerpot being mountable on a vertical wall with said aligned flat portion of said body and bowl being disposed against said vertical wall.

2. A flowerpot according to claim 1 wherein said flat portion of said body sidewall has an extended section projecting beyond and above said top opening, said extended section having means for mounting said flowerpot on said vertical wall.

3. A flowerpot according to claim 1 wherein the outer diameter of said peripheral portion of said bottom wall of said body is equal to the outer diameter of the peripheral flange section of said bowl.

4. A flowerpot according to claim 1 wherein said peripheral flange section of said bowl has notches for receiving said projections.

5. A flowerpot according to claim 1 wherein said arcuate first portion of said bowl is of a hemispherical configuration.

6. A flowerpot according to claim 1 wherein said arcuate first portion of said body side wall is circular.

* * * * *